United States Patent
Tsiklauri et al.

(10) Patent No.: US 10,866,317 B2
(45) Date of Patent: Dec. 15, 2020

(54) ELECTRONIC DEVICE WITH CO-LOCATED INDEPENDENT RADAR TRANSCEIVERS

(71) Applicant: Apple Inc., Cupertino, CA (US)

(72) Inventors: Mikheil Tsiklauri, Cupertino, CA (US); Jouya Jadidian, Saratoga, CA (US); Vaneet Pathak, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 16/132,510

(22) Filed: Sep. 17, 2018

(65) Prior Publication Data

US 2020/0088870 A1    Mar. 19, 2020

(51) Int. Cl.
*G01S 13/87* (2006.01)
*G01S 7/41* (2006.01)
(Continued)

(52) U.S. Cl.
CPC .............. *G01S 13/87* (2013.01); *G01S 7/411* (2013.01); *G01S 13/003* (2013.01); *G01S 13/50* (2013.01)

(58) Field of Classification Search
CPC .......... G01S 7/411; G01S 7/414; G01S 7/415; G01S 13/003; G01S 13/46; G01S 13/50; G01S 13/87; G01S 19/42
See application file for complete search history.

(56) References Cited

U.S. PATENT DOCUMENTS 8,217,827 B2   7/2012 Hayward
9,164,167 B2   7/2015 Reiter
(Continued)

FOREIGN PATENT DOCUMENTS

EP   2 587 347 A2   5/2013
EP   3 184 974 A1   6/2017

OTHER PUBLICATIONS

Tenglong Fan, et al.; "Hand Gesture Recognition Based on Wi-Fi Chipsets"; 2017 IEEE Radio and Wireless Symposium (RWS); IEEE; Jan. 15, 2017; three pages.

(Continued)

*Primary Examiner* — Dao L Phan
(74) *Attorney, Agent, or Firm* — Kowert, Hood, Munyon, Rankin & Goetzel, P.C.

(57) ABSTRACT

An electronic device that performs radar measurements is described. This electronic device includes independent, co-located radar transceivers, and the independent radar transceivers are not synchronized with each other. Moreover, the radar transceivers may have different fields of view that partially overlap. During operation, the radar transceivers transmit radar signals and perform the radar measurements. Then, based at least in part on the radar measurements, the electronic device determines a location of an object in an environment around the electronic device. For example, the location may include an angular position that is determined from the amplitudes of the radar measurements performed using at least a subset of the radar transceivers. Furthermore, the object may be an individual, and the electronic device may identify the individual based at least in part on the radar measurements. Note that the radar measurements performed by a given radar transceiver do not provide angular information.

20 Claims, 9 Drawing Sheets

(51) Int. Cl.
*G01S 13/00* (2006.01)
*G01S 13/50* (2006.01)

(56) References Cited

U.S. PATENT DOCUMENTS

| | | |
|---|---|---|
| 9,075,145 B2 | 10/2015 | Hyde |
| 2008/0169961 A1* | 7/2008 | Steinway ................ A61B 5/05 342/27 |
| 2018/0100918 A1 | 4/2018 | Davis |
| 2018/0224980 A1 | 8/2018 | Avila |

OTHER PUBLICATIONS

International Search Report and Written Opinion, Application No. PCT/US2019/051351, dated Nov. 27, 2019, 17 pages.

\* cited by examiner

ELECTRONIC DEVICE WITH CO-LOCATED INDEPENDENT RADAR TRANSCEIVERS

FIELD

The described embodiments relate, generally, to radar measurements by an electronic device, and techniques for performing radar measurements using an electronic device with collocated and independent radar transceivers.

BACKGROUND

Ideally, a user interface for an electronic device requires little or no advanced knowledge by a user or training for proper operation. Moreover, the user interface should be tailored to a user's preferences and their mental model of a task. These attributes help ensure that the user interface is intuitive and easy to use, which improves user efficiency and customer satisfaction.

However, many existing user interfaces in electronic devices do not achieve these ideals. Consequently, these existing user interfaces can be cumbersome and difficult for users to use.

Further, based on advances in speech recognition, many electronic devices now include voice user interfaces. A voice user interface allows a user to control and, more generally, to interact with an electronic device by simply speaking to it.

Accurately identifying a user of a voice user interface can be challenging, which may make it more difficult to accurately customize a voice user interface to the preferences and needs of a particular user.

SUMMARY

An electronic device that performs radar measurements is described. This electronic device includes multiple independent radar transceivers that are co-located in the electronic device, where a given radar transceiver includes at least one transmitter and at least one receiver. The independent radar transceivers need not be synchronized with each other. Moreover, the radar transceivers may have different fields of view, e.g., that may partially overlap. During operation, the radar transceivers transmit radar signals and perform the radar measurements. Then, based at least in part on the radar measurements, the electronic device determines a location of an object in an environment around the electronic device, where the location includes an angular position corresponding to amplitudes of the radar measurements. Note that the radar measurements performed by a given radar transceiver do not provide angular information.

Moreover, a given radar transceiver may have a directional antenna pattern that is other than or different from an omnidirectional antenna pattern.

Furthermore, the radar transceivers may collectively provide 360° coverage around the electronic device in a horizontal plane.

Additionally, there may be, e.g., four or eight fields of view. For example, a given field of view may include an angular range that is greater than 90° and less than 180°. However, the radar transceivers may have static fields of view. Notably, in some embodiments the directional antenna pattern may be static or may not rotate about an axis.

In some embodiments, the electronic device includes at least one of a top radar transceiver or a bottom radar transceiver, which, respectively, have a field of view above or below the electronic device. During operation, the top radar transceiver and/or the bottom radar transceiver may transmit additional radar signals and may perform additional radar measurements. Then, based at least in part on the additional radar measurements, the electronic device may determine a vertical dimension of the environment.

Note that the object may be (or include) an individual. Moreover, the electronic device may identify the individual based at least in part on the radar measurements. Identifying the individual can include determining a specific identity of the individual or an identifying attribute or characteristic of the individual. Furthermore, based at least in part on the radar measurements, the electronic device may determine a vital sign and/or a medical condition of the individual.

Additionally, the electronic device may determine one or more horizontal dimensions of the environment or an orientation of the electronic device in the environment based at least in part on the radar measurements. Alternatively or additionally, based at least in part on the radar measurements, the electronic device may determine one of: an acoustic property of the object in the environment, or an acoustic property of the environment.

In some embodiments, the transmitted radar signals may include at least one of pulsed radar signals and continuous-wave radar signals. The transmitted radar signals may allow the electronic device to determine the object's location when the object is static or moving in the environment.

Note that determining the location may involve one or more of: performing a search proximate to a previous location of the object, restricting changes in the location based at least in part on a predefined speed of the object and a time interval corresponding to the radar measurements, reducing shadowing, reducing multi-path signals, filtering noise, and/or correcting for target blocking.

Moreover, the object's location may be determined based at least in part on the radar measurements and weights associated with the radar transceivers.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for determining a location of an object. The method includes at least some of the aforementioned operations performed by the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
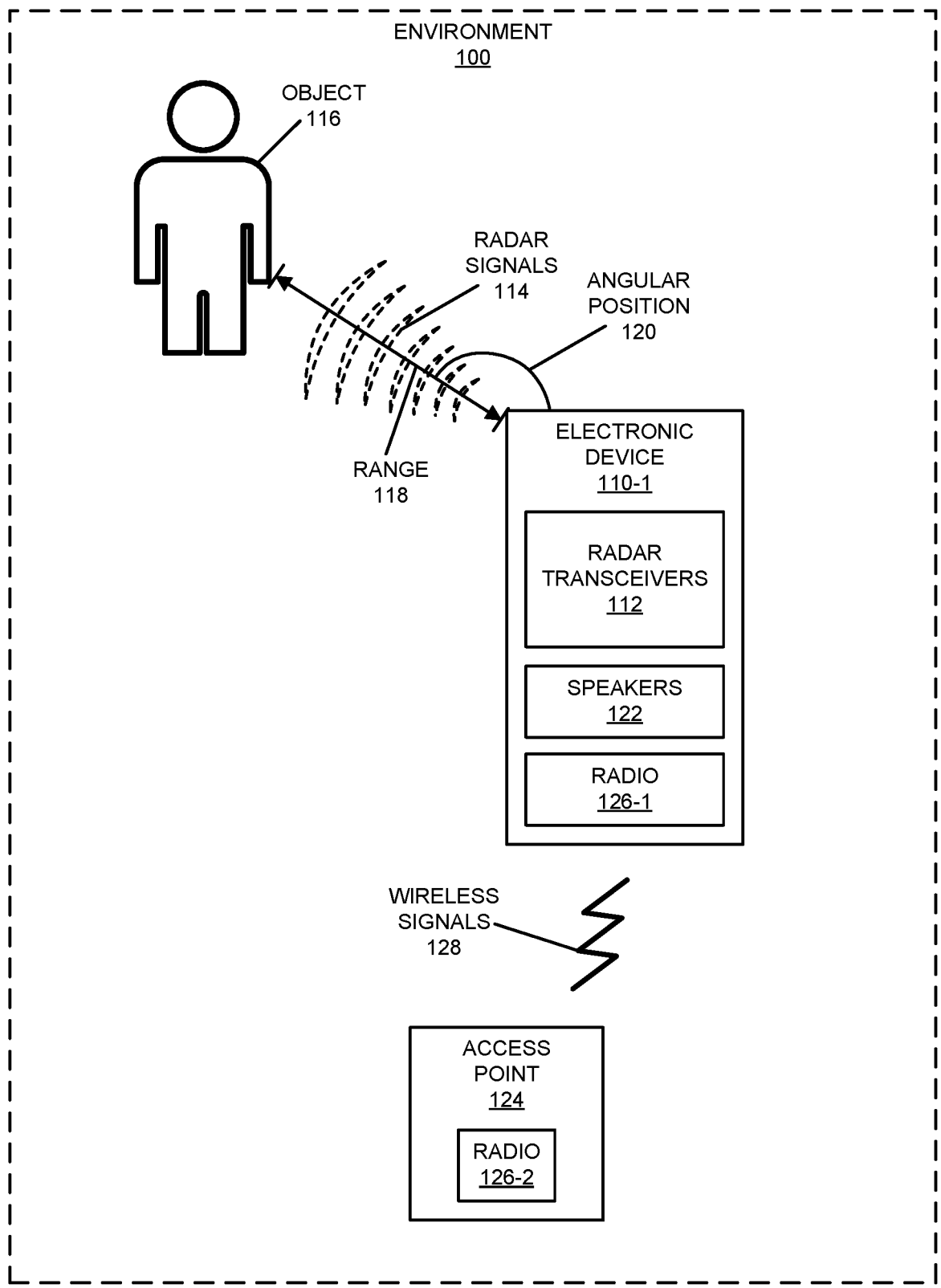
FIG. 1 is a block diagram illustrating an example of an electronic device performing radar measurements.

An electronic device that performs radar measurements is described. This electronic device includes multiple independent radar transceivers that are co-located in the electronic device. The independent radar transceivers need not be synchronized with each other. Moreover, two or more of the radar transceivers may have different fields of view. Further, the fields of view of two or more radar transceivers may partially overlap. During operation, the radar transceivers transmit radar signals and perform the radar measurements. Then, based at least in part on the radar measurements, the electronic device determines a location of an object in an environment around the electronic device. For example, the location may include an angular position that is determined from the amplitudes of the radar measurements performed using the radar transceivers. The electronic device can detect multiple different objects and can distinguish between different objects. Furthermore, an object may be an individual. The electronic device may identify the individual based at least in part on the radar measurements. Identifying the individual can include determining a specific identity of the individual or determining an identifying attribute or characteristic of the individual. Note that the radar measurements performed by a given radar transceiver do not provide angular information.

By determining the location and/or the identity of the individual, these measurement techniques may facilitate improved operation of the electronic device. For example, these capabilities may allow the electronic device to continuously, or periodically, monitor the individual, including any commands provided by the individual (such as spoken commands or gestures). Thus, the capabilities of the electronic device may facilitate a user interface that responds to the individual without requiring that the individual utilize predefined keywords or commands. Moreover, based at least in part on the identity of the individual, the user interface may be customized using their preferences and/or needs. Consequently, the electronic device may provide a user interface that requires little or no advanced knowledge by the individual or training for proper operation, and that can be customized or tailored. Therefore, the electronic device may be intuitive and easy to use, which improves user efficiency and customer satisfaction.

In the discussion that follows, the electronic device performs the radar measurements using radar signals in one or more bands of frequencies. For example, the radar signals may have one or more carrier or fundamental frequencies between 5-10 GHz. More generally, the radar signals may have one or more carrier or fundamental frequencies between 300 MHz and 100 GHz. For example, the radar signals may have fundamental frequencies between 2.5 GHz (which penetrate clothing and tissue) and 60 GHz (which is largely blocked or reflected by the human body). In some embodiments, the radar signals may include or may be compatible with ultra-wideband (which is sometimes referred to as UWB or 'pulse radio').

Note that the measurement techniques may be used in conjunction with one or more other wireless ranging or location techniques in accordance with a communication protocol, such as a communication protocol that is compatible with an IEEE 802.11 standard (which is sometimes referred to as Wi-Fi). In some embodiments, the measurement techniques are used with IEEE 802.11BA and/or IEEE 802.11ax. However, the measurement techniques may also be used with a wide variety of other communication protocols, and in electronic devices (such as portable electronic devices or mobile devices) that can incorporate multiple different radio access technologies (RATs) to provide connections through different wireless networks that offer different location-based services and/or capabilities.

Therefore, the electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point.

Additionally, it should be understood that, in some embodiments, the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of an electronic device that performs radar measurements. Notably, electronic device 110 (such as a smartphone, a laptop computer, a notebook computer, a tablet, a wireless speaker, an IoT device or another such electronic device) may include multiple independent radar transceivers 112 that are co-located in electronic device 110. Note that a given radar transceiver may include at least one transmitter and at least one receiver. At a given time, at least a subset of the independent radar transceivers 112 may transmit radar signals 114 and perform the radar measurements on the returned or the reflected radar signals to determine the location of one or more objects, such as an object 116 (e.g., an individual, furniture, a wall or boundary, etc.) in an environment 100 (such as a room) that includes electronic device 110. For example, the transmitted radar signals 114 may include pulsed radar signals and/or continuous-wave radar signals.

As described further below with reference to FIGS. 2-7, the independent radar transceivers 112 may not be synchronized with each other. Consequently, the location of object 116 may be determined based at least in part on the amplitudes of the radar measurements without using phase or timing information. For example, a range or distance 118 between electronic device 110 and object 116 may be determined using a ratio of a measured receive amplitude (or, equivalently, a measured receive power) to a transmitted amplitude (or a transmitted power). However, an angular position 120 in such a calculation is typically unknown because distance 118 merely specifies the radius of a circle around electronic device 110 where object 116 may be located. As described further below with reference to FIG. 4, in the disclosed measurement techniques electronic device 110 determines distance 118 and angular position 120 based at least in part on the amplitudes of the radar measurements performed by at least a subset of the independent radar transceivers 112. However, a given radar transceiver may not provide angular information.

Figure 8:
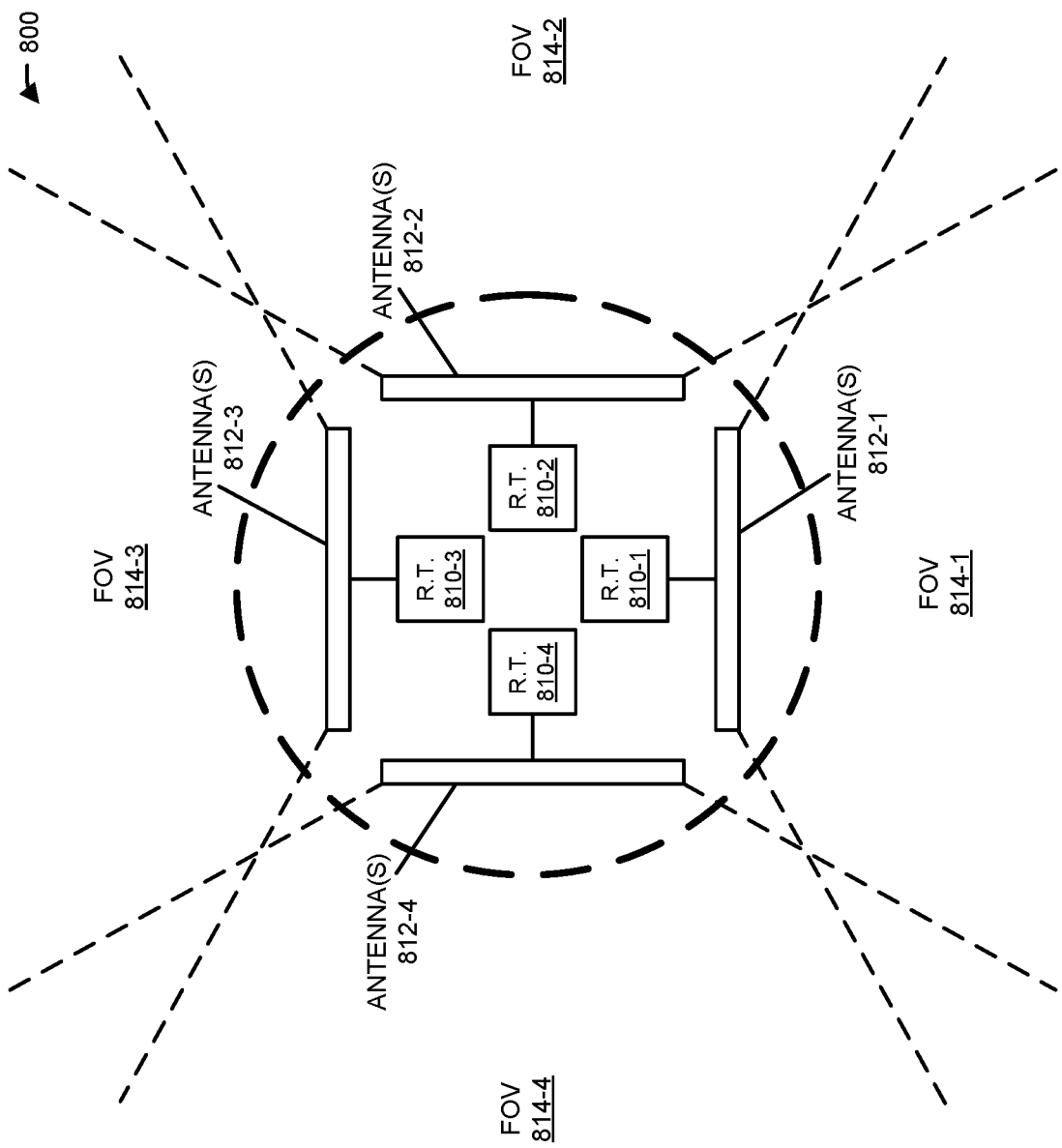
FIGS. 8-9 are drawings illustrating example top views of an example electronic device.
Figure 9:
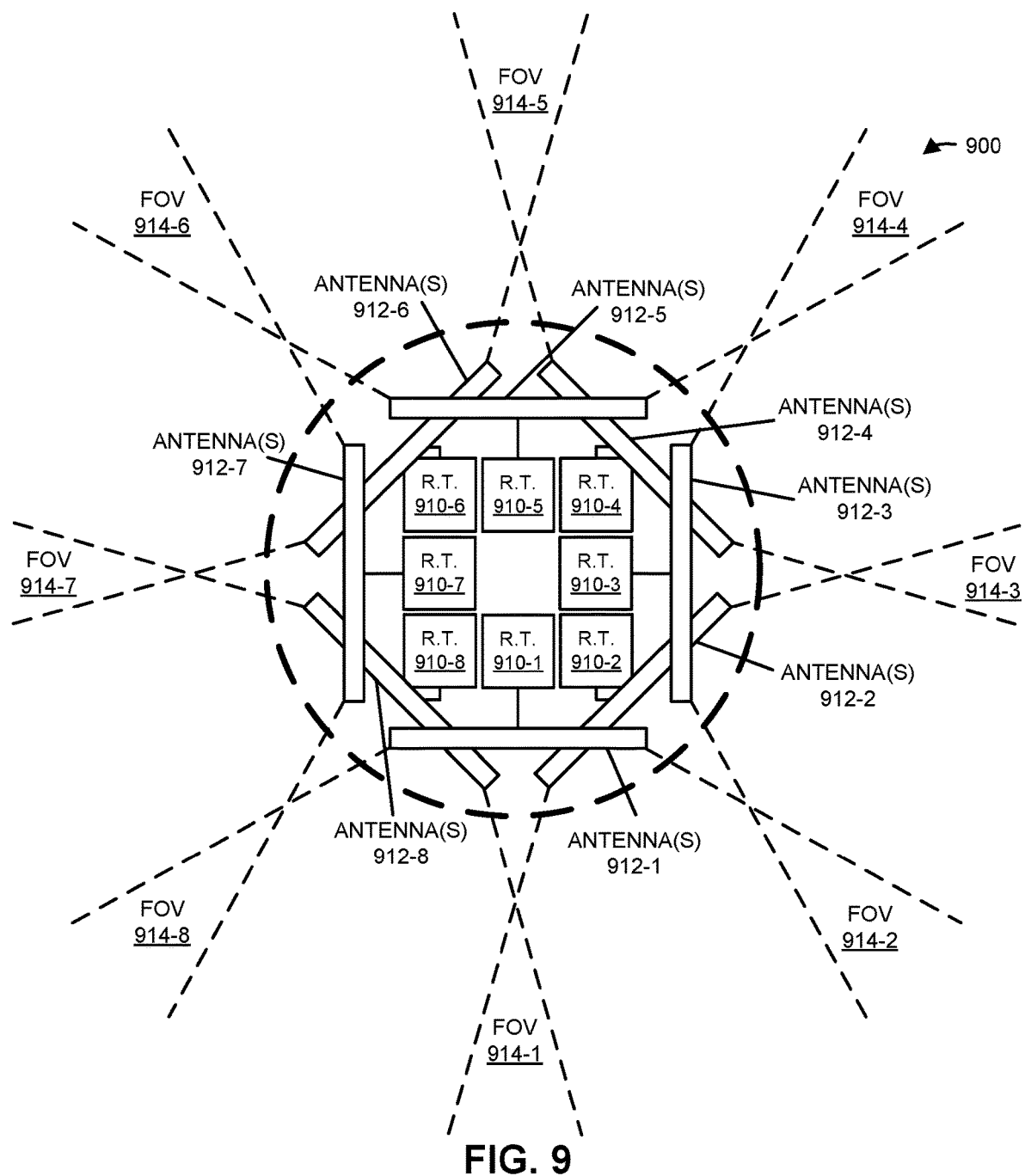

Moreover, as described further below with reference to FIGS. 8 and 9, the independent radar transceivers 112 may have different fields of view that partially overlap. For example, there may be four or eight fields of view, and a given field of view may include an angular range that is greater than 90° and less than 180°. In other embodiments, more or fewer fields of view can be implemented. Therefore, the independent radar transceivers 112 may provide 360° coverage around electronic device 110 in a horizontal plane. However, radar transceivers 112 may have static fields of view. Notably, in some embodiments the directional antenna pattern may be static or may not rotate about an axis.

Furthermore, electronic device 110 may identify object 116 (such as the identity of an individual or one or more characteristics of an individual, e.g., adult, child, etc.) based at least in part on the radar measurements. Additionally, based at least in part on the radar measurements, electronic device 110 may determine a vital sign of the individual and/or a medical condition of the individual. In some embodiments, electronic device 110 may determine based at least in part on the radar measurements: one or more dimensions of environment 100, an acoustic property of object 116 or environment 100 (such as absorption or a reverberation time), and/or an orientation of electronic device 110 in environment 100.

In these ways, the measurement techniques may allow electronic device 110 to determine the location of object 116, including when object 116 is moving and/or static. Moreover, by identifying the individual, the measurement techniques may facilitate an improved user interface for controlling electronic device 110. For example, based at least in part on their identity, the individual may be automatically authorized to control electronic device 110. Furthermore, stored user preferences and/or historical actions of the identified individual may be accessed, so that electronic device 110 may automatically provide a user experience that is customized to the individual. Additionally, based at least in part on the determined location, electronic device 110 may directionally listen for spoken commands from the individual or may be able to determine when the individual is providing a command for electronic device 110 (e.g., by detecting a gesture or using the measured radar signals). This may allow the individual to control electronic device 110 without using keywords, such as a wake word to activate electronic device. Instead, electronic device 110 may provide an ever-present sensing capability. In some embodiments, the determined vital sign(s) and/or the medical condition(s) of the individual facilitates an additional service or application. Alternatively or additionally, the determined dimension(s), acoustic property and/or orientation may allow sound (such as a sound field) output by speakers 122 in or associated with electronic device 110 to be tailored or customized to conditions in environment 100. These capabilities may improve the user experience when using electronic device 110.

In some embodiments, electronic device 110 (such as a smartphone, a laptop computer, a notebook computer, a tablet, a wireless speaker, an IoT device, or another such electronic device) and access point 124 may communicate wirelessly, e.g., in a WLAN using an IEEE 802.11 communication protocol. Thus, electronic device 110 may be associated with access point 124. For example, electronic device 110 and access point 124 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 124 may provide access to a network, such as the Internet, via an Ethernet protocol, and may be a physical access point or a virtual or 'software' access point that is implemented on a computer or an electronic device.

Figure 10:
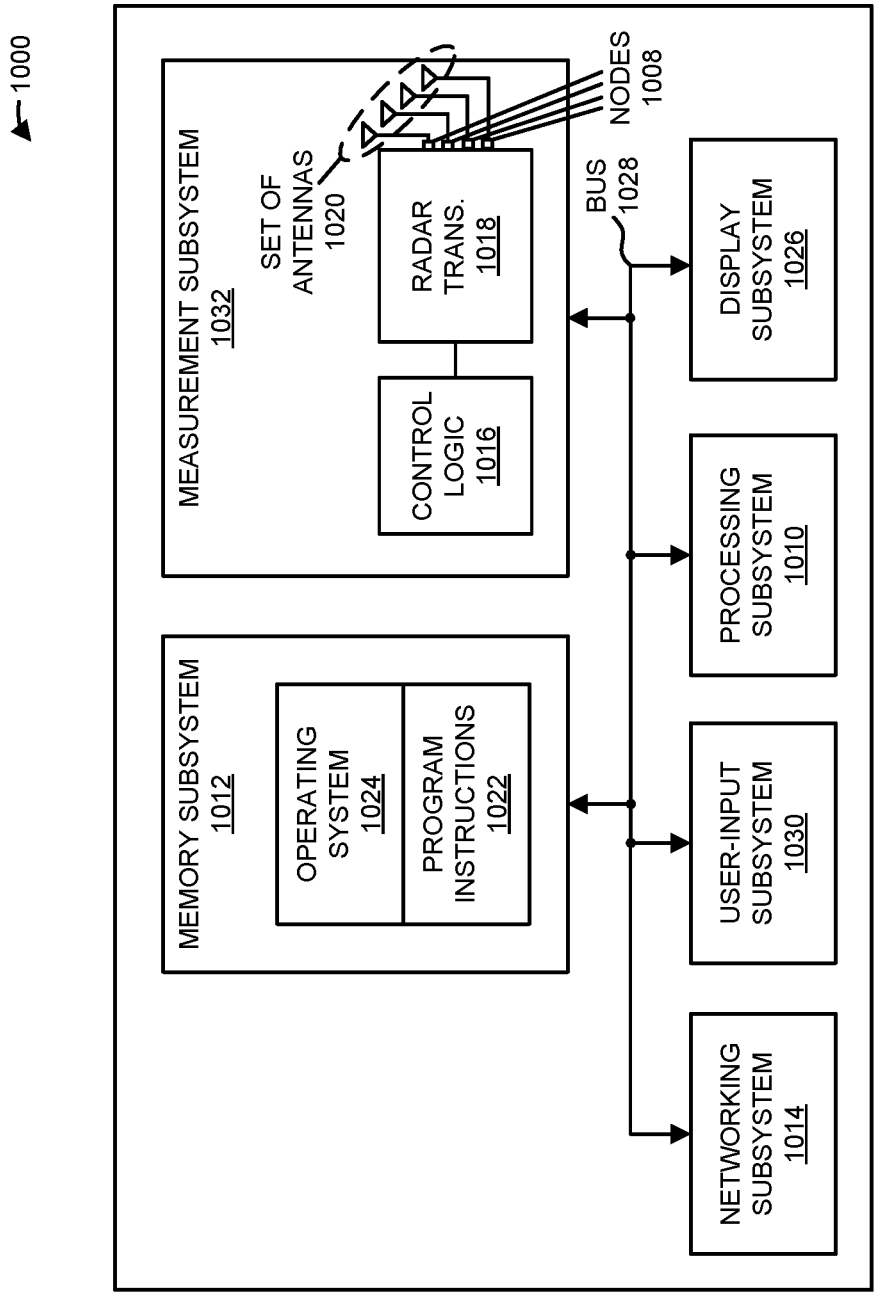
FIG. 10 is a block diagram illustrating an example of the electronic device of FIG. 1.

As described further below with reference to FIG. 10, electronic device 110 and/or access point 124 may include subsystems, such as a networking subsystem, a memory subsystem, a processor subsystem and a measurement subsystem. In general, electronic device 110 may include any electronic device with a measurement subsystem that enables electronic device 110 to perform radar measurements. In addition, electronic device 110 and/or access point 124 may include radios 126 in the networking subsystems. In some embodiments, electronic device 110 and access point 124 can include (or can be included within) any electronic devices with networking subsystems that enable electronic device 110 and access point 124, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 128 (represented by a jagged line) are communicated by radios 126-1 and 126-2 in electronic device 110 and access point 124, respectively. For example, as noted previously, electronic device 110 and access point 124 may exchange packets using a Wi-Fi communication protocol in a WLAN. In some embodiments, radio 126-1 may receive wireless signals 128 that are transmitted by radio 126-2. Alternatively, radio 126-1 may transmit wireless signals 128 that are received by radio 126-2.

Note that access point 124 and electronic device 110 may be compatible with an IEEE 802.11 standard that includes trigger-based channel access (such as IEEE 802.11ax). However, access point 124 and electronic device 110 may also communicate with one or more legacy electronic devices that are not compatible with the IEEE 802.11 standard (i.e., that do not use multi-user trigger-based channel access). In some embodiments, electronic device 110 uses multi-user transmission (such as orthogonal frequency division multiple access or OFDMA). For example, radio 126-2 may provide a trigger frame for one or more electronic devices. Moreover, after radio 126-1 receives a trigger frame, radio 126-1 may provide a group acknowledgment to radio 126-2. For example, radio 126-1 may provide the acknowledgment during an assigned time slot and/or in an assigned channel in the group acknowledgment. However, in some embodiments the one or more electronic devices may individually provide acknowledgments to radio 126-2. Thus, after radio 126-1 receives the trigger frame, radios (such as radio 126-1) in the one or more electronic devices) may provide an acknowledgment to radio 126-2.

In the described embodiments, processing a packet or frame in electronic device 110 and access point 124 includes: receiving wireless signals 128 encoding a packet or a frame; decoding/extracting the packet or frame from received wireless signals 128 to acquire the packet or frame; and processing the packet or frame to determine information contained in the packet or frame (such as data in the payload).

In general, the communication via the WLAN in the measurement techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, different electronic devices may be transmitting and/or receiving radar signals.

Figure 2:
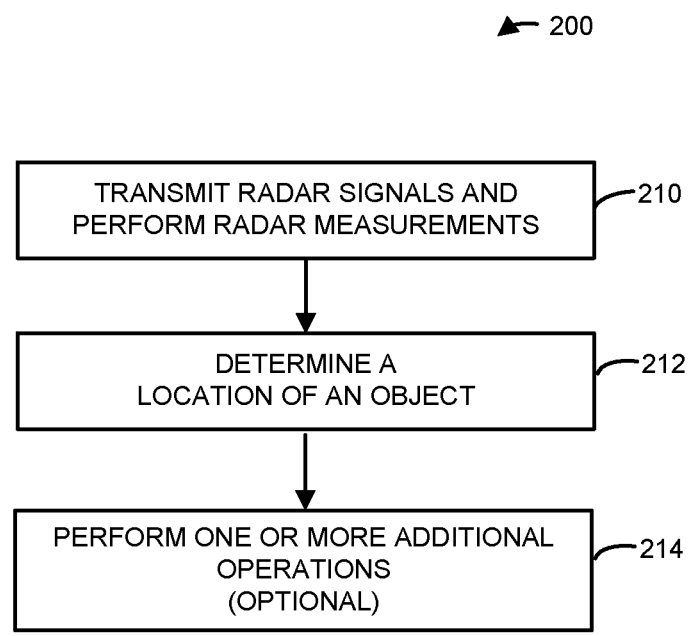
FIG. 2 is a flow diagram illustrating an example method for determining a location of an object using the electronic device in FIG. 1.

FIG. 2 presents a flow diagram illustrating an example method 200 for determining a location of an object. This method may be performed by an electronic device, such as electronic device 110 in FIG. 1. During operation, the electronic device transmits radar signals and performs radar measurements (operation 210), where the transmitting of the radar signals and the performing of the radar measurements is by multiple independent radar transceivers that are co-located in the electronic device. Note that a given radar transceiver may include at least one transmitter and at least one receiver, and the independent radar transceivers are not synchronized with each other.

Moreover, the independent radar transceivers may have different fields of view, some of which may partially overlap. For example, there may be four or eight fields of view. A given field of view may include an angular range that is greater than 90° and less than 180°. For example, in some implementations, a field of view may cover an angular range of 100° to 130°. In some embodiments, the independent radar transceivers may provide 360° coverage around the electronic device in a horizontal plane. Furthermore, a given radar transceiver may have a directional antenna pattern that is other than or different from an omnidirectional antenna pattern.

Then, based at least in part on the radar measurements, the electronic device determines a location of an object (operation 212) in an environment around the electronic device, where the location includes an angular position corresponding to amplitudes of the radar measurements. For example, the location may be determined based at least in part on the radar measurements and weights associated with the independent radar transceivers. Further, the electronic device can be configured to determine locations for multiple different objects.

Note that determining the location may involve any/all of: performing a search proximate to a previous location of the object, restricting changes in the location based at least in part on a predefined speed of the object and a time interval corresponding to the radar measurements, reducing shadowing, reducing multi-path signals, filtering noise, and/or correcting for target blocking.

In some embodiments, the electronic device optionally performs one or more additional operations (operation 214). For example, the object may include an individual. Moreover, the electronic device may identify the individual based at least in part on the radar measurements. Note that, in some embodiments, the individual may be identified based at least in part on speech recognition. Furthermore, based at least in part on the radar measurements, the electronic device may determine a vital sign of the individual and/or a medical condition of the individual.

Additionally, the electronic device may determine one or more horizontal dimensions of the environment or an orientation of the electronic device in the environment based at least in part on the radar measurements. In some embodiments, the electronic device includes at least one of a top radar transceiver or a bottom radar transceiver, which, respectively, have a field of view above or below the electronic device. During operation, the top radar transceiver and/or the bottom radar transceiver may transmit additional radar signals and may perform additional radar measurements. Then, based at least in part on the additional radar measurements, the electronic device may determine a vertical dimension of the environment.

Moreover, based at least in part on the radar measurements, the electronic device may determine one of: an acoustic property of the object in the environment or an acoustic property of the environment.

In some embodiments, the transmitted radar signals may include pulsed radar signals and (e.g., frequency modulated) continuous-wave radar signals. The transmitted radar signals may allow the electronic device to determine the location when the object is static or moving in the environment. Moreover, the pulsed radar signals may offer low power consumption (with a range resolution of, e.g., 5 cm), and the continuous-wave radar signals may provide rich Doppler measurements (with a range resolution of, e.g., a fraction of a centimeter). Thus, the range resolution in the radar measurements may be, e.g., between 1-10 cm. Note that a duration of the pulsed radar signals may be, e.g., 1 ns, which may, at least in part, determine a near-field resolution of the electronic device. Furthermore, a maximum range of the radar signals may be, e.g., 10-20 m, and a latency of the radar signals may correspond to, e.g., a 25 ms/radar frame. Additionally, the carrier frequency of the radar signals may be configurable between, e.g., 6 and 10 GHz, and a transmit or a receive antenna for a given radar transceiver may have an area of 12×14 mm$^2$.

In some embodiments of method 200 (FIG. 2), there may be additional or fewer operations. Further, one or more different operations may be included. Moreover, the order of the operations may be changed, and/or two or more operations may be combined into a single operation or performed at least partially in parallel.

Figure 3:
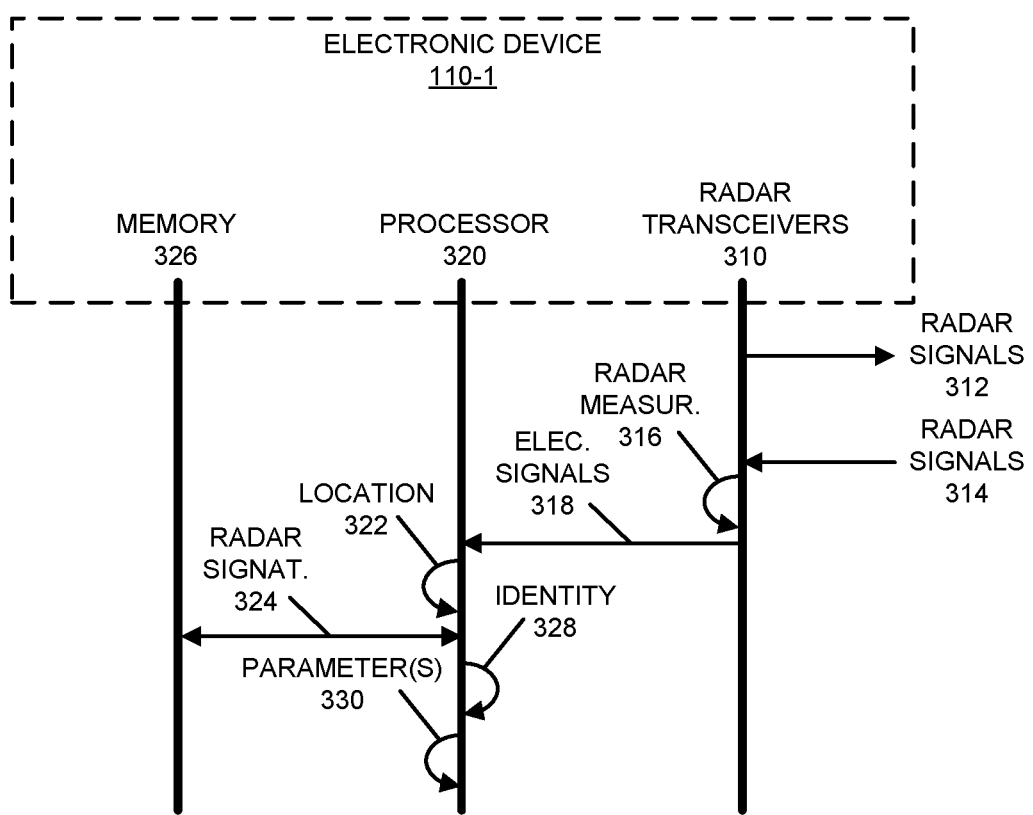
FIG. 3 is a flow diagram illustrating an example of communication among components in the electronic device of FIG. 1.

The measurement techniques are further illustrated in FIG. 3, which presents a flow diagram illustrating an example of communication among components in electronic device 110. During operation, independent radar transceivers 310 co-located in electronic device 110 may transmit radar signals 312. Note that the transmitted radar signals 312 may include pulsed radar signals and/or continuous-wave radar signals.

Subsequently, independent radar transceivers 310 may perform radar measurements 316 of reflected or returned radar signals 314. Note that independent radar transceivers 310 may not be synchronized with each other. After performing these radar measurements, independent radar transceivers 310 may provide electrical signals 318 corresponding to radar measurements 316 to processor 320.

Next, processor 320 may determine a location 322 (including an angular position) of an object in an environment that includes electronic device 110 based at least in part on radar measurements 316. For example, location 322 may be determined based at least in part on amplitudes of radar measurements 316 that are specified by electrical signals 318.

Moreover, processor 320 may access one or more radar signatures 324 stored in memory 326 in electronic device 110, and may use the one or more radar signatures 324 to identify 328 an individual based at least in part on radar measurements 316 (as specified by electrical signals 318). For example, processor 320 may compare radar measurements 316 and the one or more radar signatures 324 to determine one or more match scores, and the identity may be determined based on one of the one or more match scores (such as a best or maximum match score).

Furthermore, processor 320 may determine one or more additional parameters 330 based at least in part on radar measurements 316 (as specified by electrical signals 318). For example, processor 320 may determine a vital sign of the individual (such as a pulse, a blood pressure, or a respiration rate of the individual) and/or a medical condition of the individual (such as a medical emergency, a disease, a physical symptom, such as a tremor, a physical condition, e.g., dementia based at least in part on a gait of the individual, etc.). Alternatively or additionally, the one or more additional parameters 330 may include one or more dimensions of the environment. In some embodiments, the one or more additional parameters 330 include an acoustic property of the object in the environment or an acoustic property of the environment. For example, processor 320 may access a look-up table, stored in memory 326, with acoustic properties of different materials and/or objects as a function of radar measurements. Using this look-up table, processor 320 may use radar measurements 316 (as specified by electrical signals 318) to determine the acoustic property.

While communication between the components in FIG. 3 is illustrated with unilateral or bilateral communication (e.g., lines having a single arrow or dual arrows), in general a given communication operation may be unilateral or bilateral.

The measurement techniques may provide centimeter-accurate, low-cost, low-power user localization using single-node independent radar transceivers. Notably, the measurement techniques may be used by an electronic device to determine the location of an individual (and, more generally, an object) in a confined space or environment. In order to do so, the electronic device may need to distinguish the individual from one or more static objects in the environment and/or one or more other individuals. Because the radar transceivers may not be synchronized, the location of the individual may be determined based on amplitudes of measured radar signals performed by the individual radar transceivers, which may be co-located in the electronic device. Moreover, the measurement techniques may include one or more operations to remove artifacts, such as: shadowing, multi-path, noise, target blocking, etc. In some embodiments, the measurement techniques may be used to determine dimensions of the environment and/or a relative orientation of the electronic device in the environment.

Many radar measurement techniques have difficulty in providing angular resolution without synchronizing radar transmitters and receivers. However, synchronization is typically costly in terms of the die area and increases power consumption. Moreover, image-based localization techniques can be: power intensive, relatively expensive, and require light illumination. Image-based localization techniques also may raise privacy issues, can be sensitive to obstruction, may provide less accurate range information, and may have a significant impact on the form factor. For example, LIDAR-based systems can be expensive and power intensive, can be sensitive to obstruction, and may occupy a relatively large space. Similarly, many ultrasound-based systems can consume relatively large amounts of power, can be prone to interference, and can be sensitive to obstruction.

The measurement techniques may allow an electronic device to determine the location of an individual based on amplitudes of independent, individual radar transceivers (with at least a single transmitter and a single receiver) co-located in the electronic device. For example, the location may be determined using vector superposition of the amplitudes of the radar signals measured by the radar transceivers. Note that, because the radar transceivers are not synchronized, the radar measurements may be serial data. In some embodiments, the measurement techniques use localization concepts or operations, such as: searching near a previous location of the individual, not allowing more than a maximum jump or change in the location of the individual, and/or determining the location using a weight analysis.

For example, the electronic device may have four or eight sensors or radar transceivers. Therefore, each of the quadrants may have one or two radar transceivers. Further, there may be another radar transceiver between the main quadrant sensors.

There may be several challenges or problems in determining the location in the measurement techniques. Notably, each of the radar transceivers may include a single transmitter and a single receiver. (However, in other embodiments, there may be more transmitters and/or more receivers.) Because the radar transceivers are not synchronized, there may not be any (direct) angular information. Therefore, in order to determine the location of the individual, the measurement techniques may use the measured amplitudes of neighboring radar transceivers. Intuitively, if the individual is closer to a radar transceiver, this radar transceiver will receive a stronger signal. For example, suppose radar transceivers i and j receive the highest signals (or the largest amplitudes) during the radar measurements. Moreover, the positions of these radar transceiver are $v_i$ and $v_j$, respectively, and the received or measured signal amplitudes are $a_i$ and $a_j$, respectively. If the estimated ranges are $r_i$ and $r_j$, respectively, then the location may be calculated as $$\frac{a_i^p r_i v_i + a_j^p r_j v_j}{a_i^p + a_j^p}.$$

Figure 4:
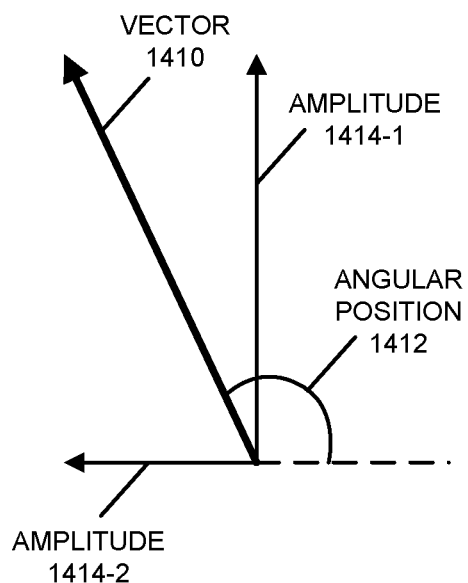
FIG. 4 is a drawing illustrating an example of determining a location of an object based on measured amplitudes.

Thus, this weight analysis can use the measured amplitudes of neighboring radar transceivers to collaboratively determine the angular position of the individual. As an illustration of the weight analysis, FIG. 4 presents a drawing illustrating an example of determining a vector 1410 (including angular position 1412) to the location of an object based on measured amplitudes 1414 from two radar transceivers.

Moreover, there may be jitter in the estimated or determined location because of amplitude fluctuation even if the object is static. This may be addressed by locking the determined location of the individual if the measured Doppler speed is less than a threshold for consecutive frames. For example, the measurement techniques may time average 17-255 frames/s. If the measured Doppler speed is static (e.g., 0.5 Hz and, more generally, less than 10 Hz), the determined location may be locked.

Furthermore, a radar transceiver may not have the strongest signal even if the individual is closest to the radar transceiver. This may be due to the amplitude fluctuations. This problem may be addressed in the measurement techniques by taking or using the radar transceiver having the highest power (or amplitude) based on history. For example, a buffer may be maintained with a record of an identifier of the radar transceiver with the highest instantaneous power (or amplitude). Then, for each frame, the radar transceiver with the highest average power (or amplitude) may be calculated based on the records in the buffer.

Additionally, a dynamic background may create ghost objects if a naïve background subtraction is used. For example, when a chair is moved, a previous background may change. This problem may be addressed in the measurement techniques by using adaptive clutter subtraction (which is sometimes referred to as 'motion target indicator filtering'). Notably, when a complex signal x(t) is received, the background may be updated as b(t)=a·b(t−1)+(1−a)·x(t), where 0<a<1. Then, the background subtraction may be x(t)=x(t)−b(t). Note that a defines the tradeoff between memory and variation or noise in the background subtraction (because a pure dynamic subtraction may be noisy, while a purse static subtraction is time invariant). In some embodiments, a is 0.5. Alternatively, in some embodiments a corresponds to a memory of, e.g., ten frames.

Note that, with adaptive clutter subtraction, when an individual leaves or exits the environment, wall clutter may pop up and may be (incorrectly) identified as an object. This problem may be addressed in the measurement techniques by constraining the search region, during a peak search, within some predefined or predetermined distance from the last estimated peak (which is sometimes referred to as 'spatial filtering'). This constraint may be based on the intuition that an object cannot move suddenly to a remote location within a frame duration.

Figure 5:
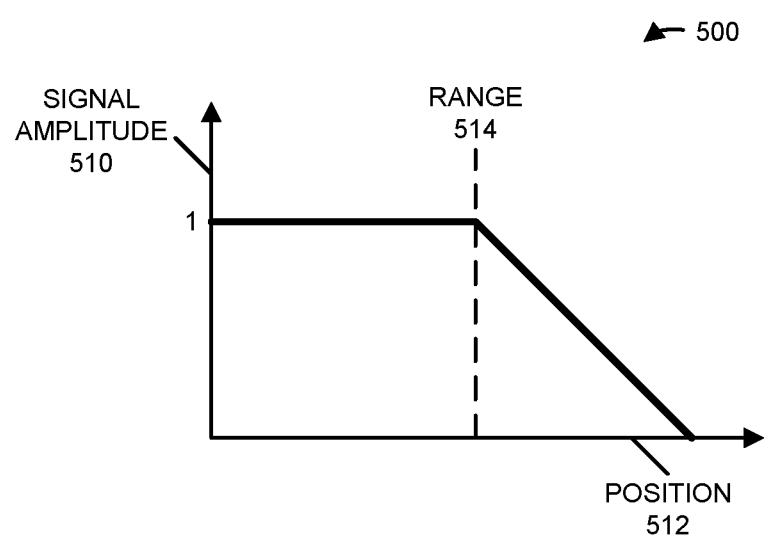
FIG. 5 is a drawing illustrating an example of spatial filtering.

FIG. 5 presents a drawing illustrating an example of spatial filtering. Notably, a spatial filter 500 may attenuate the signal amplitude 510 as a function of position 512 relative to the position of the last or previous estimated peak. For example, spatial filter 500 may reduce the signal amplitude 510 for positions farther than a predefined range 514 from the position of the last or previous estimated peak. The linear filter in spatial filter 510 may remove the temporary shadow associated with the background subtraction that can occur following motion in the environment.

Moreover, artifacts can be removed by constraining motion or changes in the determined location between adjacent frames based on a predefined maximum speed of the individual (which is sometimes referred to as a 'causality constraint'). For example, the predefined maximum speed may be 5-6 m/s.

Figure 6:
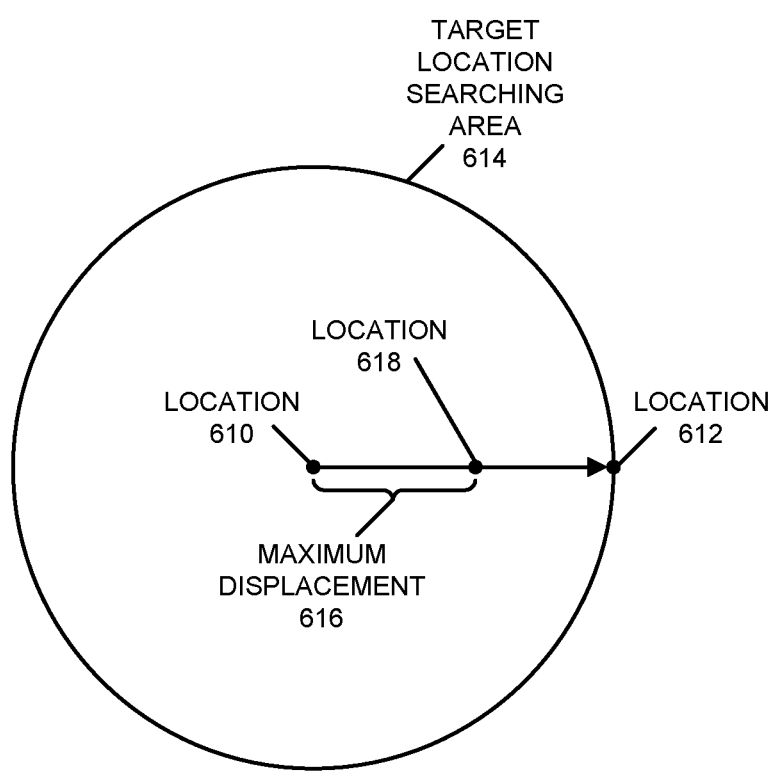
FIG. 6 is a drawing illustrating an example of a causality constraint.

FIG. 6 presents a drawing illustrating an example of a causality constraint. Notably, a determined location 612 for a current time frame may be detected in a target location searching area 614 for the current time frame relative to a determined location 610 for a previous time frame. Based on a maximum displacement 616 (the product of the predefined maximum speed and the time interval between adjacent frames), an adjusted determined location 618 for current time frame may be determined.

Furthermore, artifacts can also be removed by requiring continuity of movement. Notably, the determined location 618 should be nearby the determined location 610. Consequently, as shown in FIG. 6, the target location searching area 614 is nearby determined location 610. For example, the target location searching area 614 may have a radius of 5-10 m/s times a time interval corresponding to 17-255 frames/s. Note that the use of the target location searching area 614 may reduce the power consumption (and, thus, the temperature) of the electronic device.

In some embodiments, the identity of the individual and their location history may be used by the electronic device when determining the location. Moreover, the location of the individual may be determined by the electronic device in real time. Note that the determined location of the individual may be provided with up to a 500 ms delay, which may not be perceivable by a user of the electronic device.

Furthermore, in some embodiments, the radar signals may be restricted to the environment (e.g., based on the carrier frequency of the radar signals). Consequently, the radar signals may not penetrate walls or boundaries between, e.g., different rooms. In addition to eliminating or reducing multi-path signals, this constraint may help protect the privacy of other individuals who are not located in the environment.

Figure 7:
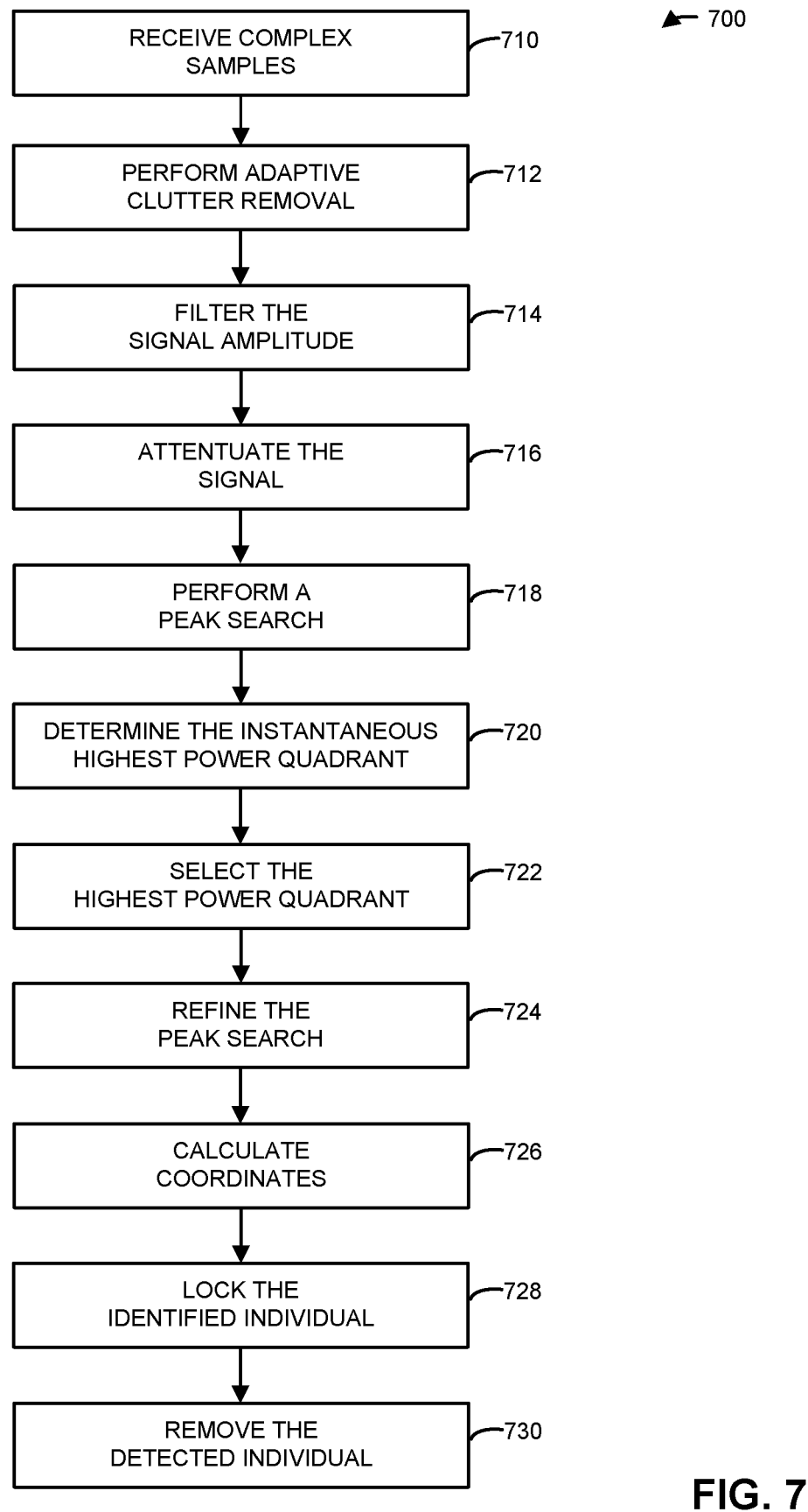
FIG. 7 is a flow diagram illustrating an example of a method for performing radar measurements using the electronic device in FIG. 1.

FIG. 7 presents a flow diagram illustrating an example method for performing radar measurements using the electronic device in FIG. 1. During operation, the electronic device may receive complex samples (operation 710) of the radar signals, and may perform adaptive clutter removal (operation 712). Then, the electronic device may filter the signal amplitude (operation 714) across frames, and may attenuate the signal (operation 716) after the last estimated peak in the radar signals. Moreover, the electronic device may perform a peak search (operation 718) within a region close to the last peak, and may determine the instantaneous highest power quadrant (operation 720).

Next, the electronic device may select the highest power quadrant (operation 722) as the quadrant with the highest vote in the buffer. Furthermore, the electronic device may refine the peak search (operation 724) for all the radar transceivers (e.g., by constraining the search region of the radar transceivers neighboring the highest power quadrant to be close to the peak), and may calculate (x,y) coordinates (operation 726) based on the estimated range from the highest power quadrant and its neighboring quadrants. Additionally, the electronic device may lock the identified individual (operation 728) based on Doppler measurements, may optionally remove the detected individual (operation 730) if they are not detected for sufficient time, and may store the quadrant number in the buffer.

In some embodiments of the measurement techniques, the data may initially be prepared for localization. Notably, a presence estimation function (ampBgSub) may be defined for each of the radar transceivers. The presence estimation function may define the location (such as the range) of a non-static object. Moreover, the presence estimation function at each time frame k may be calculated using the function $\hat{A}$:

$$\text{ampBgSub}[k] = \text{frame}[k] - \text{ace\_clutter}[k],$$

where $\text{ace\_clutter}[k] = (1-w) \cdot \text{ace\_clutter}[k-1] + w \cdot \text{frame}[k]$, frame[k] is the current raw data (such as the in-phase/quadrature-phase or Doppler amplitude), and w is a parameter between 0 and 1. Note that w provides 'memory' in the presence estimation function. Moreover, the function $\hat{A}$ contains information from the function $\hat{A}$ for previous frames with a weight of $(1-w)^{k\hat{A}}$, where k is a memory depth. If w is small (close to zero), then the memory is strong. Alternatively, if w is equal to 1, there is no memory and the presence estimation function is the difference between two neighboring or adjacent frames.

In order to make the presence estimation function smooth, time and range averaging may be performed. For example, for each time frame k, frame[k] may be the average of N previous frames and M samples. Note that increasing N and/or M may make the determination of the location smoother, but slower.

The location of a tracking object may be determined using $$V = \Sigma_{quad=1}^{m}(\text{weight}[quad] \cdot V[quad] \cdot \text{range}[quad]),$$

where $\text{weight}[quad] = \text{ampBgSub}[quad]^m$, V[quad] is quad-th unit vector for a radar transceiver, and range[quad] is a range detected by quad-th radar transceiver, and V is a vector that defines the location of the tracking object.

In some embodiments, one or more adjustments are performed when determining the location. Notably, the search for the current location may be constrained to be in the neighborhood or proximity of the previous determined location, and a change in the determined location between adjacent frames may be constrained to be less than a predefined maximum distance.

In some embodiments, the electronic device includes four radar transceivers with four antennas in four quadrants. This is shown in FIG. 8, which presents a drawing illustrating a top view of an example of an electronic device 800. In FIG. 8, radar transceivers (R.T.s) 810 have associated antennas 812. These antennas have overlapping fields of view (FOV) 814. Moreover, each of antennas 812 may include a transmit antenna and a receive antenna. Alternatively, in some embodiments, a given radar transceiver may use the same antenna for transmitting and receiving.

In some embodiments, the electronic device includes eight radar transceivers with eight antennas in four quadrants. This is shown in FIG. 9, which presents a drawing illustrating a top view of an example of an electronic device 900. In FIG. 9, radar transceivers 910 have associated antennas 912. Note that antennas 912 are located in two different horizontal planes. Moreover, antennas 912 have overlapping fields of view 914. Furthermore, each of antennas 912 may include a transmit antenna and a receive antenna. Alternatively, in some embodiments, a given radar transceiver may use the same antenna for transmitting and receiving.

In summary, the measurement techniques may allow accurate, low-cost determination of the location of an object in an environment, such as an individual. Moreover, the measurement techniques may be used to identify the individual, a vital sign or a medical condition of the individual, and/or one or more parameters or properties of the object or the environment. The non-invasive radar measurements may simplify the use of the electronic device and may facilitate additional services and applications. Consequently, the measurement techniques may improve the user experience when using the electronic device.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include physical characteristics, demographic data, location-based data, telephone numbers, email addresses, Twitter ID's, home addresses, data or records relating to a user's health or level of fitness (e.g., vital signs measurements, medication information, exercise information, etc.), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. Notably, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Moreover, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Furthermore, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively limit or block the use of, or access to, personal information data. That is, the present disclosure contemplates that hardware and/or software elements can be provided to limit, prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 10 presents a block diagram of an electronic device 1000 (which may be a cellular telephone, a smartwatch, an access point, a wireless speaker, an IoT device, another electronic device, etc.) in accordance with some embodiments. This electronic device includes processing subsystem 1010, memory subsystem 1012, networking subsystem 1014 and measurement subsystem 1032. Processing subsystem 1010 includes one or more devices configured to perform computational operations. For example, processing subsystem 1010 can include one or more microprocessors, application-specific integrated circuits (ASICs), microcontrollers, graphics processing units (GPUs), programmable-logic devices, and/or one or more digital signal processors (DSPs).

Memory subsystem 1012 includes one or more devices for storing data and/or instructions for processing subsystem 1010, networking subsystem 1014 and/or measurement subsystem 1032. For example, memory subsystem 1012 can include dynamic random access memory (DRAM), static random access memory (SRAM), a read-only memory (ROM), flash memory, and/or other types of memory. In some embodiments, instructions for processing subsystem 1010 in memory subsystem 1012 include: program instructions or sets of instructions (such as program instructions 1022 or operating system 1024), which may be executed by processing subsystem 1010. For example, a ROM can store programs, utilities or processes to be executed in a non-volatile manner, and DRAM can provide volatile data storage, and may store instructions related to the operation of electronic device 1000. Note that the one or more computer programs may constitute a computer-program mechanism, a computer-readable storage medium or software. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010. In some embodiments, the one or more computer programs are distributed over a network-coupled computer system so that the one or more computer programs are stored and executed in a distributed manner.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), such as: control logic, an interface circuit and a set of antennas (or antenna elements) in an adaptive array that can be selectively turned on and/or off by control logic to create a variety of optional antenna patterns or 'beam patterns.' Alternatively, instead of the set of antennas, in some embodiments electronic device 1000 includes one or more nodes, e.g., a pad, which can be coupled to the set of antennas. Thus, electronic device 1000 may or may not include the set of antennas. For example, networking subsystem 1014 can include a Bluetooth networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or frame frames and/or scanning for advertising frames transmitted by other electronic devices.

Measurement subsystem 1032 includes one or more devices configured to transmit radar signals and to perform radar measurements, such as: control logic 1016, multiple independent radar transceivers 1018 that are collocated in electronic device 1000, and a set of antennas 1020 (or antenna elements) that are electrically coupled to radar transceivers 1018 at nodes 1008 (such as, e.g., one or more pads). These independent radar transceivers may not be synchronized with each other. In some embodiments, set of antennas 1020 have a directional antenna pattern that is other than or different from an omnidirectional antenna pattern.

Within electronic device 1000, processing subsystem 1010, memory subsystem 1012, networking subsystem 1014 and measurement subsystem 1032 are coupled together using bus 1028 that facilitates data transfer between these components. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display, which may include a display driver and the display, such as a liquid-crystal display, a multi-touch touchscreen, etc. Display subsystem 1026 may be controlled by processing subsystem 1010 to display information to a user (e.g., information relating to incoming, outgoing, or an active communication session).

Electronic device 1000 can also include a user-input subsystem 1030 that allows a user of the electronic device 1000 to interact with electronic device 1000. For example, user-input subsystem 1030 can take a variety of forms, such as: a button, keypad, dial, touch screen, audio input interface, visual/image capture input interface, input in the form of sensor data, etc.

Electronic device 1000 can be (or can be included in) any electronic device with at least one network interface or a measurement subsystem. For example, electronic device 1000 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program instructions 1022 are included in operating system 1024 and/or control logic 1016 is included in radar transceivers 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014. This integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Alternatively or additionally, an integrated circuit (which is sometimes referred to as a 'measurement circuit') may implement some or all of the functionality of measurement subsystem 1032. This integrated circuit may include hardware and/or software mechanisms that are used for transmitting radar signals from electronic device 1000 and receiving radar signals at electronic device 1000.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the measurement techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement techniques may be implemented using program instructions 1022, operating system 1024 (such as a driver for an interface circuit in networking subsystem 1014 or radar transceivers 1018 in measurement subsystem 1032) or in firmware in an interface circuit networking subsystem 1014 or in measurement subsystem 1032. Alternatively or additionally, at least some of the operations in the measurement techniques may be implemented in a physical layer, such as hardware in an interface circuit in networking subsystem 1014 or in measurement subsystem 1032. In some embodiments, the measurement techniques are implemented, at least in part, in a MAC layer and/or in a physical layer in an interface circuit in networking subsystem 1014.

While examples of numerical values are provided in the preceding discussion, in other embodiments different numerical values are used. Consequently, the numerical values provided are not intended to be limiting.

While the preceding embodiments illustrated the use of radar signals, in other embodiments of the measurement techniques electromagnetic signals in one or more different frequency bands are used to determine the location of the object. For example, these signals may be communicated in one or more bands of frequencies, including: 900 MHz, 2.4 GHz, 5 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising multiple independent radar transceivers that are co-located in the electronic device, wherein a given radar transceiver comprises at least one transmitter and at least one receiver,
    wherein the independent radar transceivers are not synchronized with each other,
    wherein the radar transceivers have different fields of view and for at least two of the radar transceivers the respective fields of view at least partially overlap; and
    wherein the electronic device is configured to:
        transmit radar signals using the radar transceivers;
        perform radar measurements, based at least in part on the transmitted radar signals, using the radar transceivers; and
        determine a location of an object in an environment around the electronic device based at least in part on the radar measurements, wherein the location includes an angular position corresponding to amplitudes of the radar measurements, and
        wherein the radar measurements performed by a given radar transceiver do not provide angular information and the angular position is determined based at least in part on distance information indicated by at least a portion of the radar measurements.

2. The electronic device of claim 1, wherein a given radar transceiver has a directional antenna pattern that is other than or different from an omnidirectional antenna pattern.

3. The electronic device of claim 1, wherein the radar transceivers provide 360° coverage around the electronic device in a horizontal plane.

4. The electronic device of claim 1, wherein the radar transceivers provide at least four different fields of view.

5. The electronic device of claim 4, wherein a field of view of the at least four different fields of view comprises an angular range that is greater than 90° and less than 180°.

6. The electronic device of claim 1, wherein the electronic device comprises at least one of a top radar transceiver or a bottom radar transceiver, which, respectively, have a field of view above or below the electronic device; and
wherein the electronic device is configured to:
transmit additional radar signals using the top radar transceiver, the bottom radar transceiver, or both;
perform additional radar measurements using the top radar transceiver, the bottom radar transceiver, or both; and
determine a vertical dimension of the environment based at least in part on the additional radar measurements.

7. The electronic device of claim 1, wherein the object comprises an individual; and
wherein the electronic device is configured to identify the individual based at least in part on the radar measurements.

8. The electronic device of claim 1, wherein, based at least in part on the radar measurements, the electronic device is configured to determine a vital sign associated with an individual or a medical condition associated with the individual.

9. The electronic device of claim 1, wherein, based at least in part on the radar measurements, the electronic device is configured to determine one or more horizontal dimensions of the environment or an orientation of the electronic device in the environment.

10. The electronic device of claim 1, wherein, based at least in part on the radar measurements, the electronic device is configured to determine an acoustic property of the object in the environment or an acoustic property of the environment.

11. The electronic device of claim 1, wherein the transmitted radar signals comprise pulsed radar signals and continuous-wave radar signals.

12. The electronic device of claim 1, wherein determining the location involves at least one of: performing a search proximate to a previous location of the object, restricting changes in the location based at least in part on a predefined speed of the object and a time interval corresponding to the radar measurements, reducing shadowing, reducing multipath signals, filtering noise, or correcting for target blocking.

13. The electronic device of claim 1, wherein the electronic device is configured to determine the location based at least in part on the radar measurements and weights associated with the radar transceivers.

14. A non-transitory computer-readable storage medium for use in conjunction with an electronic device, the computer-readable storage medium storing program instructions that, when executed by the electronic device, cause the electronic device to perform radar measurements by carrying out one or more operations comprising:
transmitting radar signals using independent radar transceivers co-located in the electronic device, wherein a given radar transceiver comprises at least one transmitter and at least one receiver, wherein the independent radar transceivers are not synchronized with each other, and wherein the radar transceivers have different fields of view and for at least two of the radar transceivers the respective fields of view at least partially overlap;
performing the radar measurements, based at least in part on the transmitted radar signals, using the radar transceivers; and
determining a location of an object in an environment around the electronic device based at least in part on the radar measurements, wherein the location includes an angular position corresponding to amplitudes of the radar measurements, and
wherein the radar measurements performed by a given radar transceiver do not provide angular information and the angular position is determined based at least in part on distance information indicated by at least a portion of the radar measurements.

15. The computer-readable storage medium of claim 14, wherein the object comprises an individual; and
wherein the one or more operations comprise identifying the individual based at least in part on the radar measurements.

16. The computer-readable storage medium of claim 14, wherein the one or more operations comprise determining, based at least in part on the radar measurements, an acoustic property of the object in the environment or an acoustic property of the environment.

17. The computer-readable storage medium of claim 14, wherein the transmitted radar signals comprise pulsed radar signals and continuous-wave radar signals.

18. The computer-readable storage medium of claim 14, wherein the radar transceivers collectively provide 360° coverage around the electronic device in a horizontal plane.

19. A method for performing radar measurements, comprising:
by an electronic device:
transmitting radar signals using independent radar transceivers co-located in the electronic device, wherein a given radar transceiver comprises at least one transmitter and at least one receiver, wherein the independent radar transceivers are not synchronized with each other, and wherein at least two of the radar transceivers have different fields of view that partially overlap;
performing the radar measurements, based at least in part on the transmitted radar signals, using the radar transceivers; and
determining a location of an object in an environment around the electronic device based at least in part on the radar measurements, wherein the location includes an angular position corresponding to amplitudes of the radar measurements, and
wherein the radar measurements performed by a given radar transceiver do not provide angular information and the angular position is determined based at least in part on distance information indicated by at least a portion of the radar measurements.

20. The method of claim 19, wherein the object comprises an individual; and
wherein the method comprises identifying an individual based at least in part on the radar measurements.

* * * * *